(12) United States Patent
Hashimoto et al.

(10) Patent No.: US 9,958,857 B2
(45) Date of Patent: May 1, 2018

(54) MOTOR CONTROL DEVICE, MOTOR CONTROL METHOD, AND NON-TRANSITORY COMPUTER READABLE MEDIUM RECORDING MOTOR CONTROL PROGRAM

(71) Applicant: FANUC CORPORATION, Yamanashi (JP)

(72) Inventors: Shoutarou Hashimoto, Yamanashi (JP); Tadashi Okita, Yamanashi (JP); Yuuki Morita, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days. days.

(21) Appl. No.: 15/483,258

(22) Filed: Apr. 10, 2017

(65) Prior Publication Data

US 2017/0300033 A1 Oct. 19, 2017

(30) Foreign Application Priority Data

Apr. 13, 2016 (JP) ................. 2016-0808416

(51) Int. Cl.
*H02P 1/54* (2006.01)
*G05B 11/01* (2006.01)
*G05B 19/404* (2006.01)
*G05B 19/31* (2006.01)
*G05B 19/4062* (2006.01)

(52) U.S. Cl.
CPC .......... *G05B 19/404* (2013.01); *G05B 19/31* (2013.01); *G05B 19/4062* (2013.01); *G05B 2219/34013* (2013.01); *G05B 2219/50297* (2013.01)

(58) Field of Classification Search
None
See application file for complete search history.

(56) References Cited

U.S. PATENT DOCUMENTS

2014/0062378 A1* 3/2014 Iwashita .............. G05B 19/404
318/630

FOREIGN PATENT DOCUMENTS

| JP | 4-8451 | 1/1992 |
|---|---|---|
| JP | 11-98877 | 4/1999 |
| JP | 2014-54001 | 3/2014 |
| JP | 2014-235587 | 12/2014 |

* cited by examiner

*Primary Examiner* — Bentsu Ro
*Assistant Examiner* — Zemenay Truneh
(74) *Attorney, Agent, or Firm* — Wenderoth, Lind & Ponack, L.L.P.

(57) ABSTRACT

To provide a motor control device, motor control method, and non-transitory computer readable medium recording a motor control program, which add a backlash correction amount to a position command for a motor at the appropriate timing. Included are a first position detection part that detects a first position which is a position of a movable part; a second position detection part that detects a second position which is a position of a driven part; a positional error calculation part that calculates positional error, which is deviation between a converted first position detected value and a second position detected value; and a backlash correction part that adds a backlash correction amount when the absolute value for the variation of the positional error since reversal of a position command was detected exceeds the predetermined reference value.

13 Claims, 11 Drawing Sheets

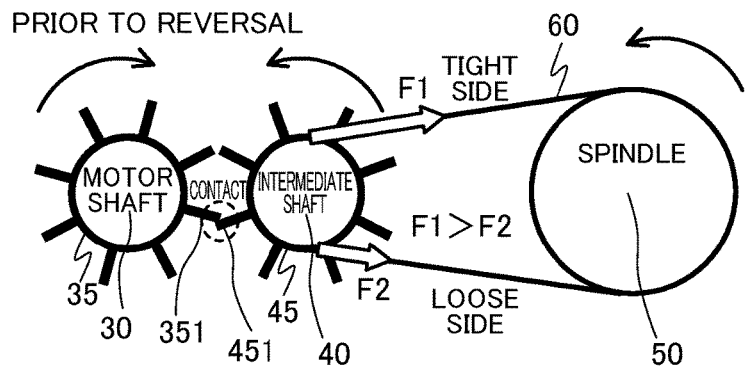
FIG. 1A  PRIOR TO REVERSAL
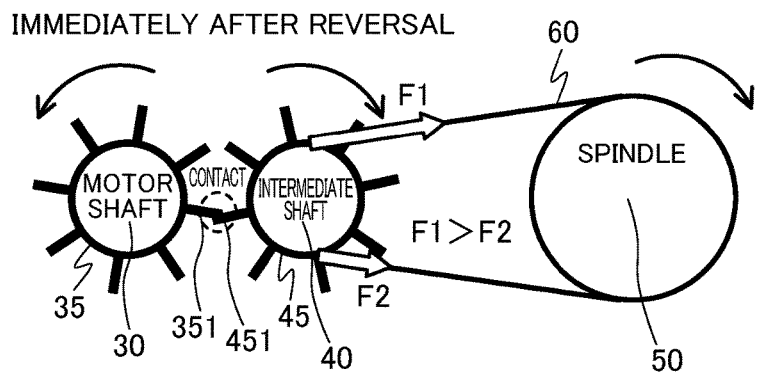
FIG. 1B  IMMEDIATELY AFTER REVERSAL
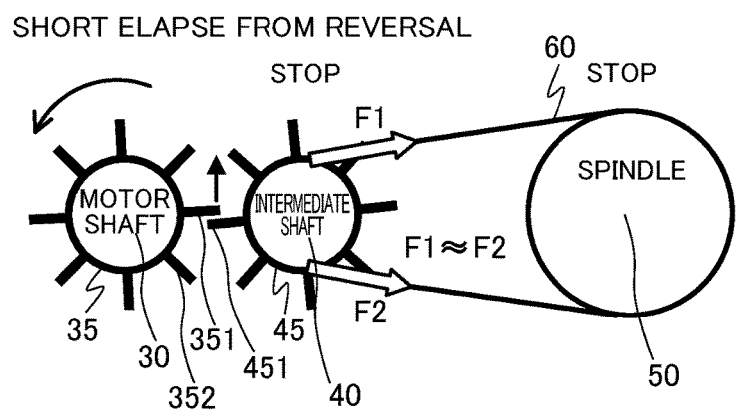
FIG. 1C  SHORT ELAPSE FROM REVERSAL
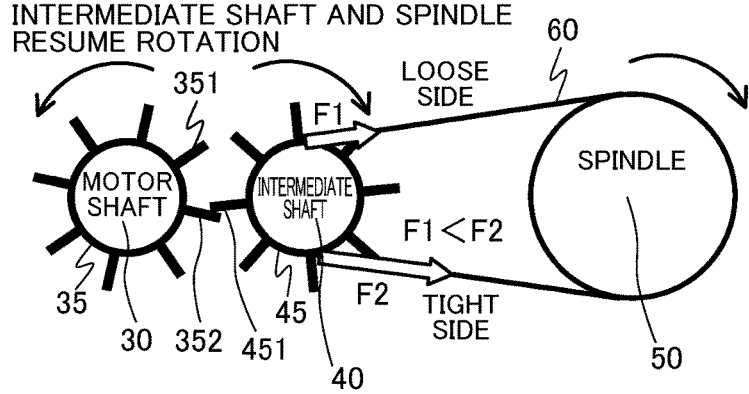
FIG. 1D  INTERMEDIATE SHAFT AND SPINDLE RESUME ROTATION

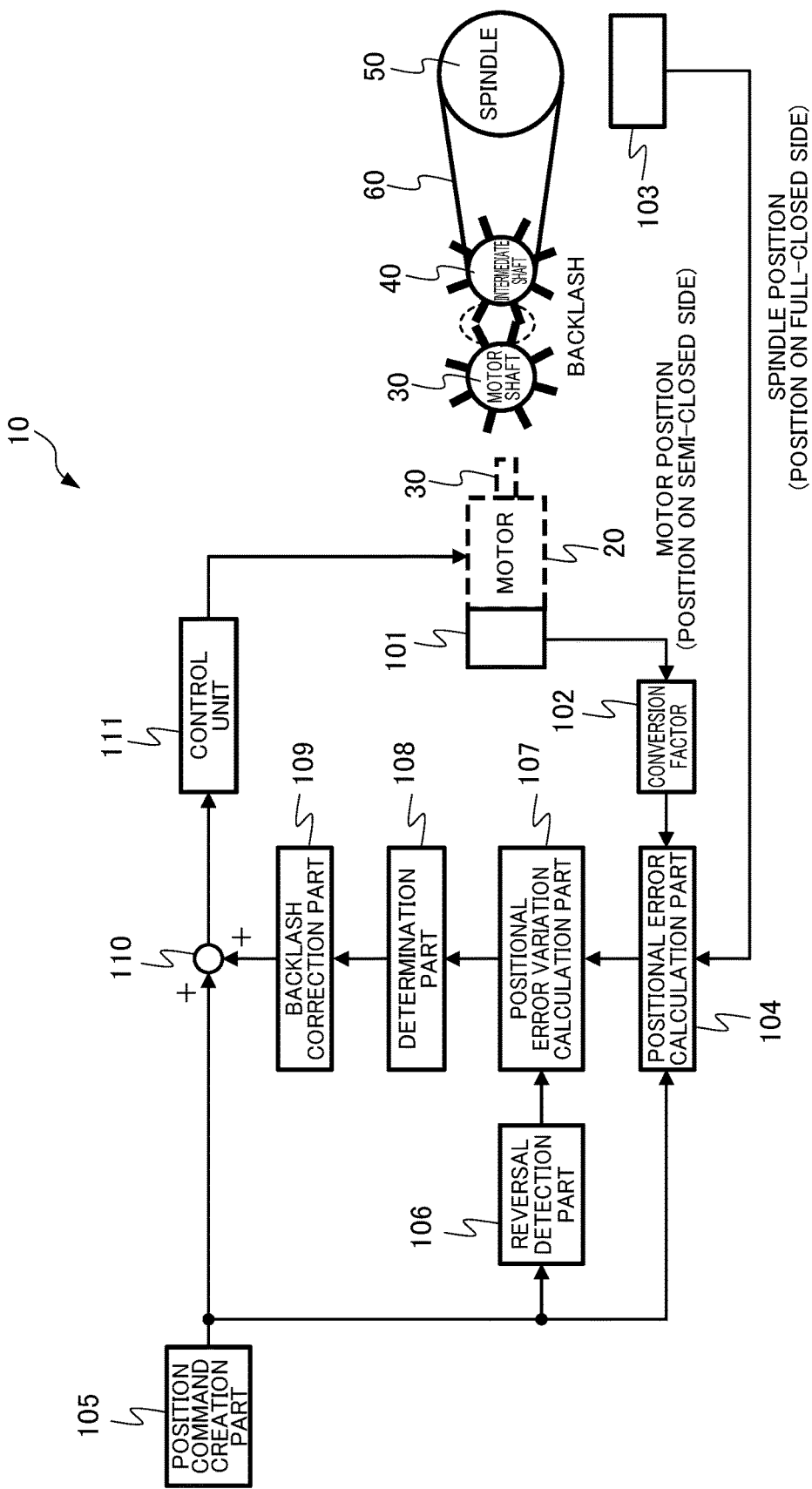

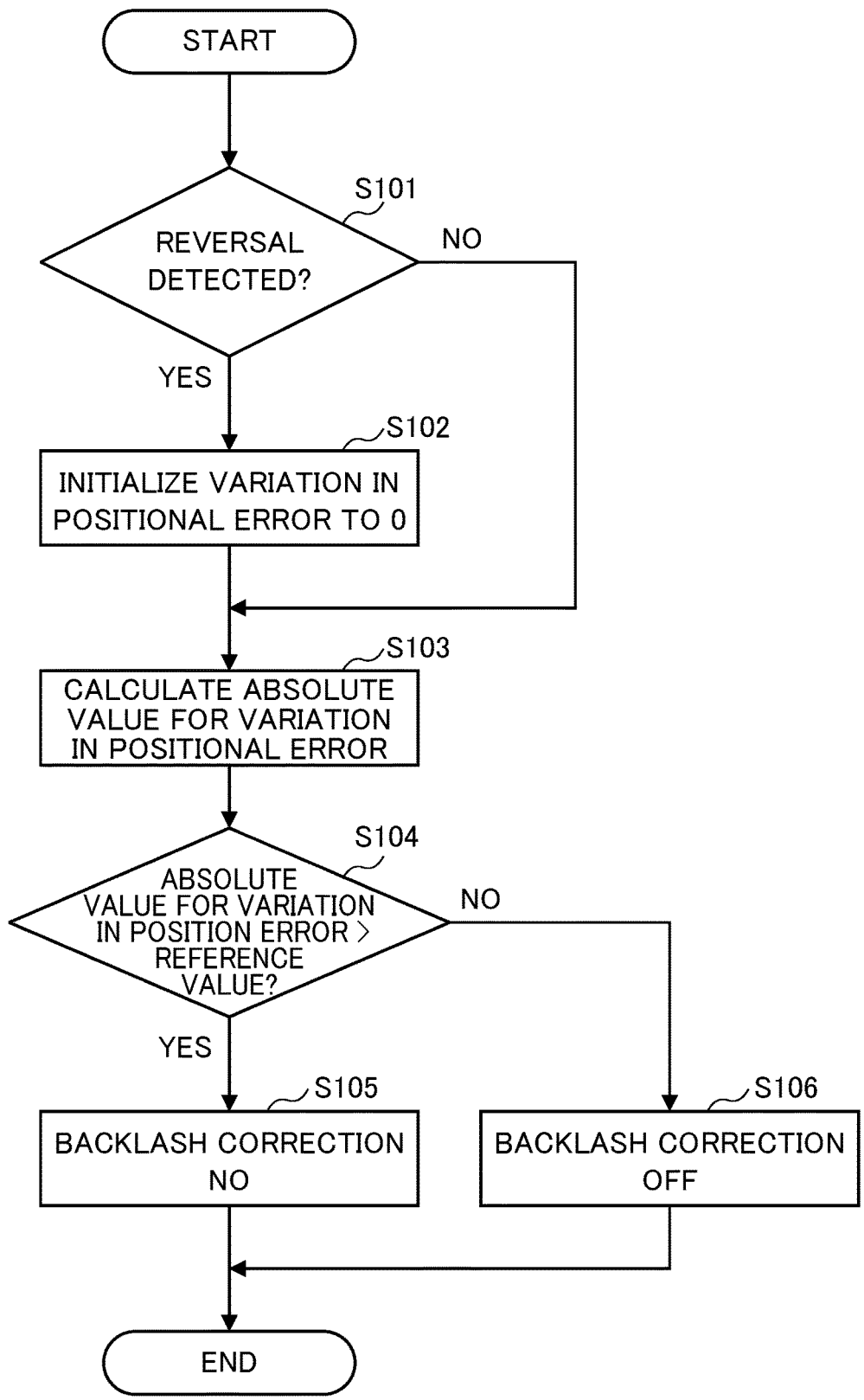

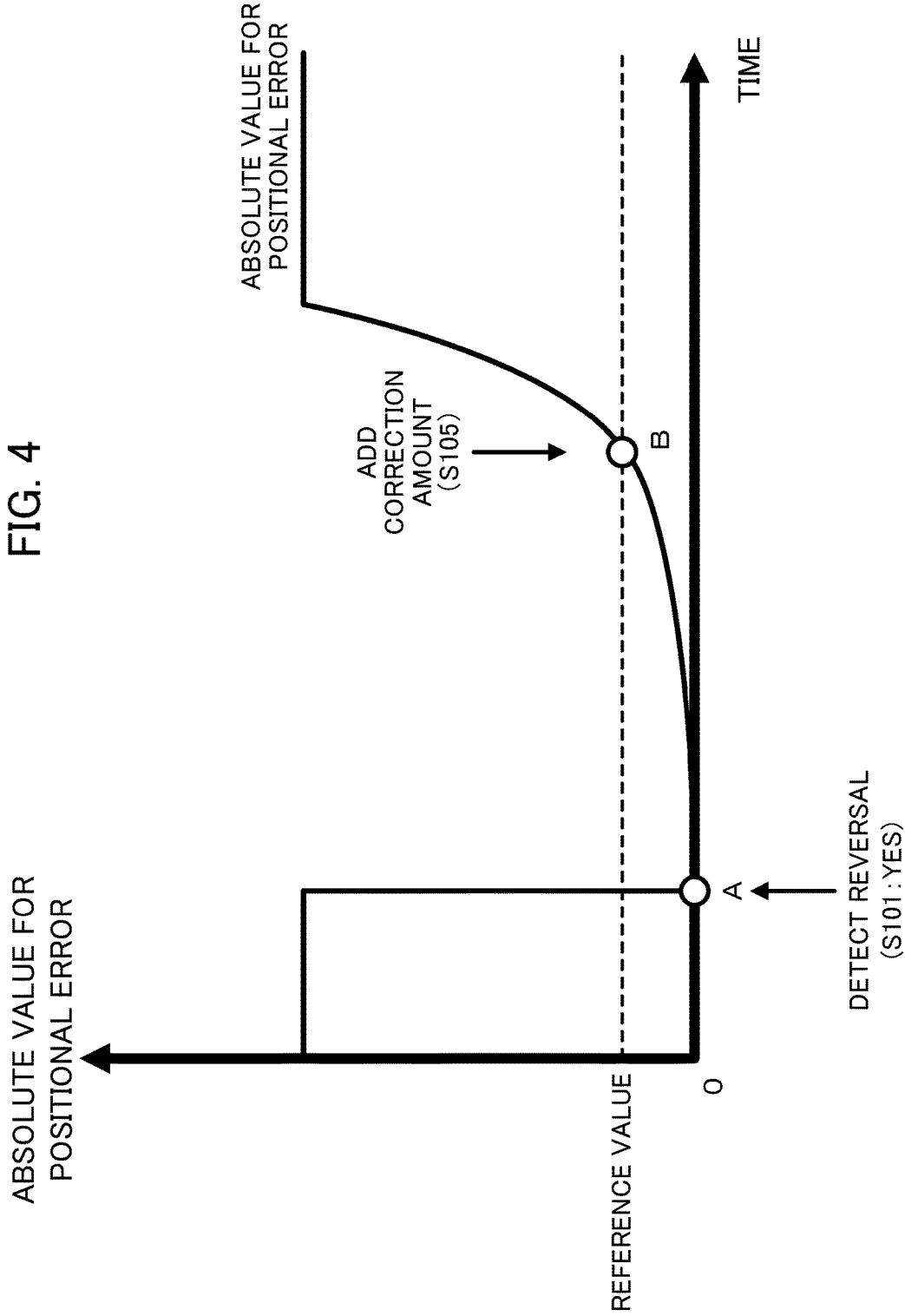

FIG. 5A
CORRECTION OFF
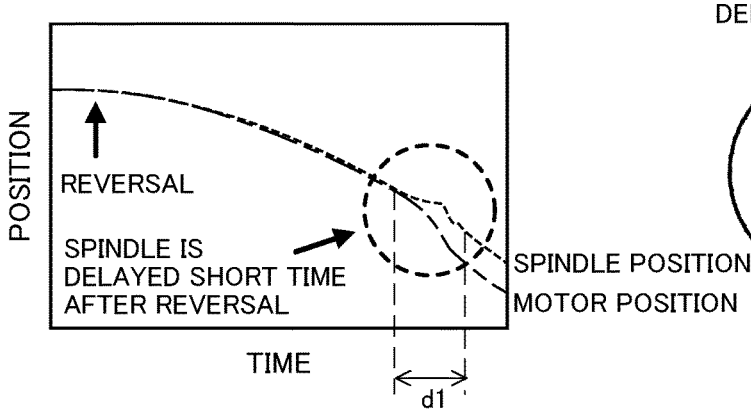
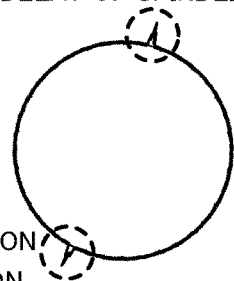
QUADRANT PROJECTION ACCORDING TO REVERSAL DELAY OF SPINDLE
FIG. 5B
CORRECTION ON IMMEDIATELY AFTER REVERSAL
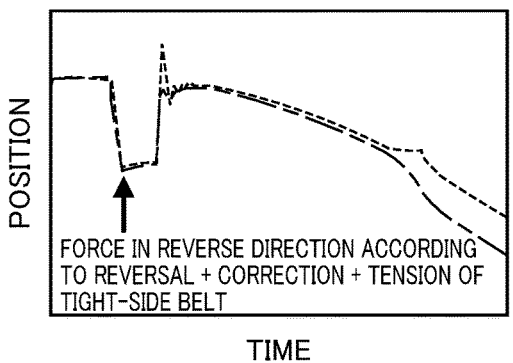
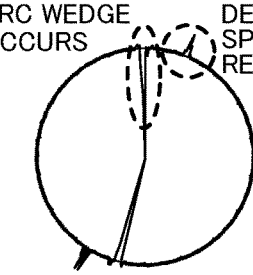
ARC WEDGE OCCURS
QUADRANT PROJECTION ACCORDING TO REVERSAL DELAY OF SPINDLE ALSO REMAINS
FIG. 5C
CORRECTION ON AFTER REVERSAL AT APPROPRIATE TIMING
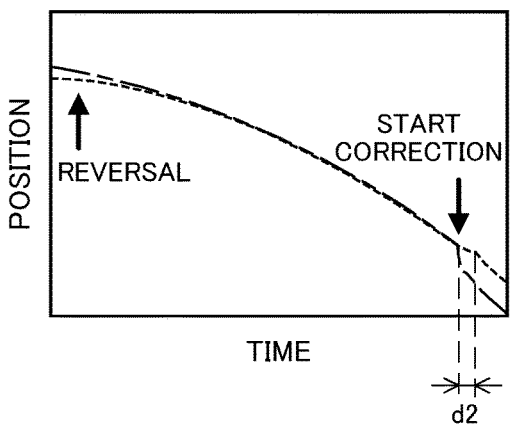
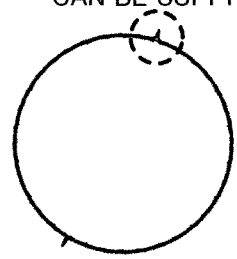
QUADRANT PROJECTION CAN BE SUPPRESSED

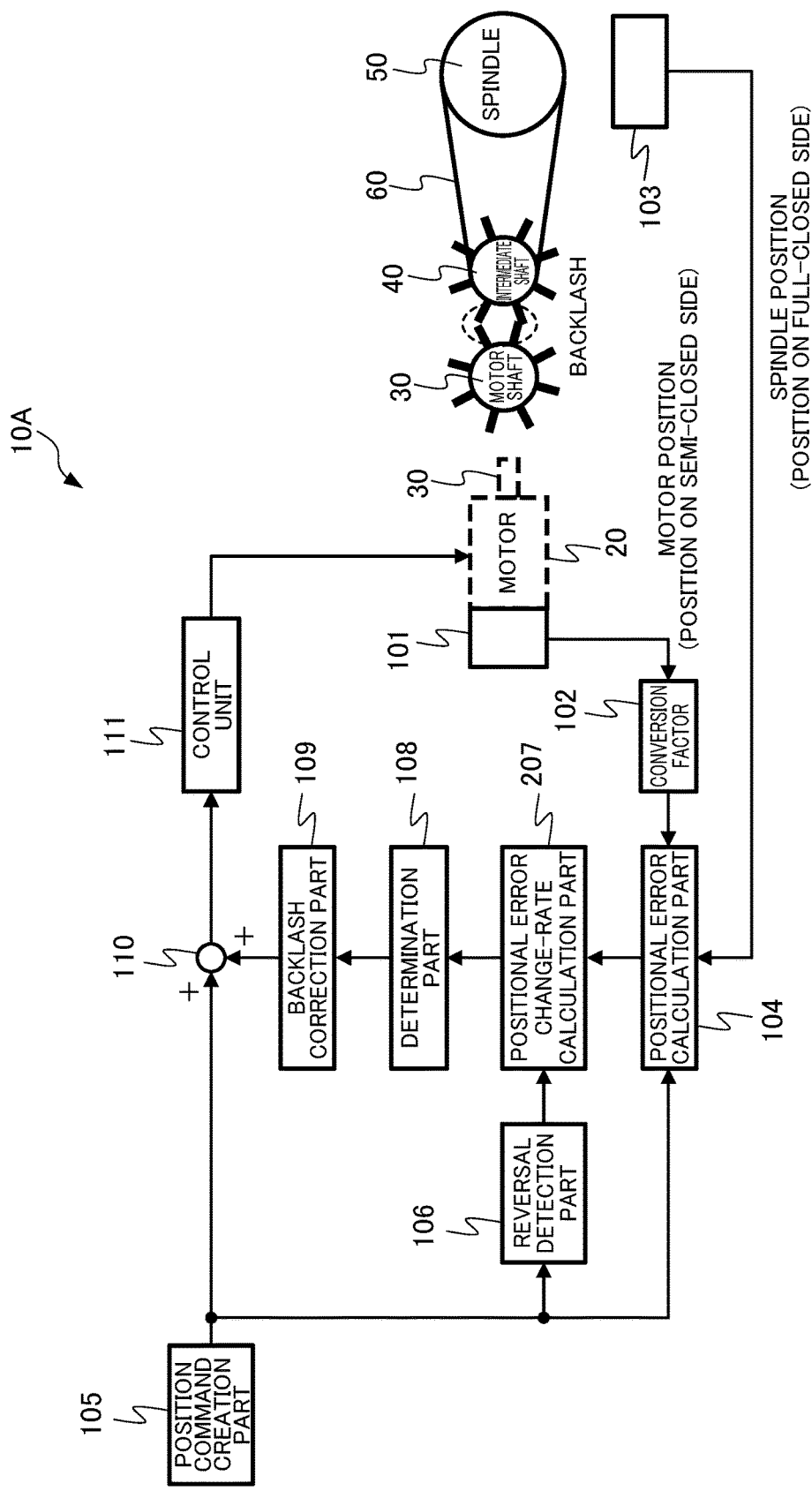

MOTOR CONTROL DEVICE, MOTOR CONTROL METHOD, AND NON-TRANSITORY COMPUTER READABLE MEDIUM RECORDING MOTOR CONTROL PROGRAM

This application is based on and claims the benefit of priority from Japanese Patent Application No. 2016-080416, filed on 13 Apr. 2016, the content of which is incorporated herein by reference.

BACKGROUND OF THE INVENTION

Field of the Invention

The present invention relates to a motor control device, a motor control method, and non-transitory computer readable medium recording a motor control program, which have a means for correcting backlash.

Related Art

Conventionally, in a control system with the position, orientation, posture, etc. of an object as controlled variables, for example, a control system of a machine tool or industrial machinery, servomotors have been used. For machine elements being used for conveying the rotation of the motor shaft of a servomotor to another main spindle, and joined together, a gap is intentionally provided at the mating surfaces between these machine elements. By way of this gap being present, machine elements such as screws and gears, for example, can rotate freely with a certain range. This gap is called "backlash".

For example, in the case of a motor and a driven shaft such as a spindle being joined by gears, due to the backlash of gears being present, when reversing the motor, the reversing of the driven shaft will be delayed relative to the reversing of the motor. In order to correct for the reversal delay of this driven shaft, there already exists a method of adding a backlash correction amount to a position command for the motor.

For example, as a method of improving the reversing behavior of a driven shaft during reversing of a motor, in a configuration having some kind of reduction mechanism between the motor and the driven shaft that is driven by this motor, Patent Document 1 discloses a method that gives a correction in the position for quickly moving by the amount of mechanical backlash possessed by the reduction mechanism, at the moment at which the motor reverses.

Patent Document 1: Japanese Unexamined Patent Application, Publication No. 2014-54001

SUMMARY OF THE INVENTION

However, the method disclosed in Patent Document 1 is persistently a backlash correction method presuming that the reversal delay of the driven part occurs immediately from the backlash possessed by the reduction mechanism during at the time of the position command or reversal of the motor. On the other hand, in the case of gears and a belt being used simultaneously in the engagement between the motor and driven shaft, the reversal delay of the driven shaft delayed from reversal of the motor due to backlash of the gears may occur from the influence of the elasticity of the belt. In such a case, if adding the backlash correction amount immediately after reversal of the motor, there has been no effect of correction, or the correction negatively impacts the reversing operation of the driven shaft, as described later.

The present invention has an object of providing a motor control device, motor control method, and non-transitory computer readable medium recording a motor control program, which add a backlash correction amount to the position command for the motor at an appropriate timing.

In a first motor control device (for example, the motor control device 10 described later) according to a first aspect of the present invention is a motor control device for correcting backlash between a movable part (for example, the motor shaft 30 described later)) that is driven by a motor, and a driven part (for example, the spindle 50 described later) that is driven by the movable part, the device includes: a first position detection part (for example, the first position detection part 101 described later) that detects a first position which is a position of the movable part; a second position detection part (for example, the second position detection part 103 described later) that detects a second position which is a position of the driven part; a positional error calculation part (for example, the positional error calculation part 104 describes later) that calculates positional error, which is deviation between a converted first position detected value arrived at by converting a first position detected value detected by the first position detection part into a value of a position of the driven part according to a rotation ratio between the movable part and the driven part; and a second position detected value detected by the second position detection part; a position command creation part (for example, the position command creation part 105 described later) that creates a position command; a reversal detection part (for example, the reversal detection part 106 described later) that detects reversal of the position command; a positional error variation calculation part (for example, the positional error variation calculation part 107 described later) that calculates an absolute value for variation of the positional error since reversal was detected; a determination part (for example, the determination part 108 described later) that determines whether the absolute value for the variation of the positional error has exceeded a predetermined reference value; and a backlash correction part (for example, the backlash correction part 109 described later) that adds a backlash correction amount to the position command based on the positional error, in which the backlash correction amount is added when the absolute value for the variation of the positional error exceeds the predetermined reference value.

In a second motor control device (for example, the motor control device 10A described later) according to a second aspect of the present invention is a motor control device for correcting backlash between a movable part (for example, the motor shaft 30 described later)) that is driven by a motor, and a driven part (for example, the spindle 50 described later) that is driven by the movable part, the device includes: a first position detection part (for example, the first position detection part 101 described later) that detects a first position which is a position of the movable part; a second position detection part (for example, the second position detection part 103 described later) that detects a second position which is a position of the driven part; a positional error calculation part (for example, the positional error calculation part 104 describes later) that calculates positional error, which is deviation between a converted first position detected value arrived at by converting a first position detected value detected by the first position detection part into a value of a position of the driven part according to a rotation ratio between the movable part and the driven part; and a second position detected value detected by the second position detection part; a position command creation part (for example, the position command creation part 105 described later) that creates a position command; a reversal detection part (for example, the reversal detection part 106 described later) that detects reversal of the position command; a positional error change-rate calculation part (for example, the positional error change-rate calculation part 207 described later) that calculates an absolute value for a change rate per unit time of the positional error since reversal was detected; a determination part (for example, the determination part 108 described later) that determines whether the absolute value for the change rate of the positional error has exceeded a predetermined reference value; and a backlash correction part (for example, the backlash correction part 109 described later) that adds a backlash correction amount to the position command based on the positional error, in which the backlash correction amount is added when the absolute value for the change rate of the positional error exceeds the predetermined reference value.

In a third motor control device (for example, the motor control device 10A described later) according to a third aspect of the present invention is a motor control device for correcting backlash between a movable part (for example, the motor shaft 30 described later)) that is driven by a motor, and a driven part (for example, the spindle 50 described later) that is driven by the movable part, the device includes: a first position detection part (for example, the first position detection part 101 described later) that detects a first position which is a position of the movable part; a second position detection part (for example, the second position detection part 103 described later) that detects a second position which is a position of the driven part; a positional error calculation part (for example, the positional error calculation part 104 describes later) that calculates positional error, which is deviation between a converted first position detected value arrived at by converting a first position detected value detected by the first position detection part into a value of a position of the driven part according to a rotation ratio between the movable part and the driven part; and a second position detected value detected by the second position detection part; a position command creation part (for example, the position command creation part 105 described later) that creates a position command; a reversal detection part (for example, the reversal detection part 106 described later) that detects reversal of the position command; a positional error change-rate calculation part (for example, the positional error change-rate calculation part 207 described later) that calculates an absolute value for a change rate of the positional error per unit variation of a motor rotation angle since reversal was detected; a determination part (for example, the determination part 108 described later) that determines whether the absolute value for the change rate of the positional error has exceeded a predetermined reference value; and a backlash correction part (for example, the backlash correction part 109 described later) that adds a backlash correction amount to the position command based on the positional error, in which the backlash correction amount is added when the change rate of the positional error exceeds the predetermined reference value.

In a fourth motor control device (for example, the motor control device 10A described later) according to a third aspect of the present invention is a motor control device for correcting backlash between a movable part (for example, the motor shaft 30 described later)) that is driven by a motor, and a driven part (for example, the spindle 50 described later) that is driven by the movable part, the device includes: a first position detection part (for example, the first position detection part 101 described later) that detects a first position which is a position of the movable part; a second position detection part (for example, the second position detection part 103 described later) that detects a second position which is a position of the driven part; a positional error calculation part (for example, the positional error calculation part 104 describes later) that calculates positional error, which is deviation between a converted first position detected value arrived at by converting a first position detected value detected by the first position detection part into a value of a position of the driven part according to a rotation ratio between the movable part and the driven part; and a second position detected value detected by the second position detection part; a position command creation part (for example, the position command creation part 105 described later) that creates a position command; a reversal detection part (for example, the reversal detection part 106 described later) that detects reversal of the position command; a positional error change-rate calculation part (for example, the positional error change-rate calculation part 207 described later) that calculates an absolute value for a change rate of the positional error per unit variation of an integrated value of the position command since reversal was detected; a determination part (for example, the determination part 108 described later) that determines whether the absolute value for the change rate of the positional error has exceeded a predetermined reference value; and a backlash correction part (for example, the backlash correction part 109 described later) that adds a backlash correction amount to the position command based on the positional error, in which the backlash correction amount is added when the absolute value for the change rate of the positional error exceeds the predetermined reference value.

According to a fifth aspect of the present invention, in the motor control device as described in any one of the first to fourth aspects, the movable part driven by the motor and the driven part driven by the movable part may be mechanically joined by combination of gears and a belt.

In a first method for controlling a motor according to a sixth aspect of the present invention that corrects for backlash between a movable part that is driven by a motor and a driven part that is driven by the movable part, the method includes the steps executed by a computer of: detecting a first position which is a position of the movable part; detecting a second position which is a position of the driven part; calculating a positional error which is a deviation between a converted first position detected value arrived at by converting a first position detected value into a value of a position of the driven part according to a rotation ratio between the movable part and the driven part, and a second position detected value; creating a position command; detecting reversal of the position command; calculating an absolute value for variation of the positional error since reversal was detected; determining whether the absolute value for the variation of the positional error has exceeded a predetermined reference value; and adding a backlash correction amount to the position command based on the positional error, when the absolute value for the variation of the positional error exceeds the predetermined reference value.

In a second method for controlling a motor according to a seventh aspect of the present invention that corrects for backlash between a movable part that is driven by a motor and a driven part that is driven by the movable part, the method includes the steps executed by a computer of:

detecting a first position which is a position of the movable part; detecting a second position which is a position of the driven part; calculating a positional error which is a deviation between a converted first position detected value arrived at by converting a first position detected value into a value of a position of the driven part according to a rotation ratio between the movable part and the driven part, and a second position detected value; creating a position command; detecting reversal of the position command; calculating an absolute value for a change rate per unit time of the positional error since reversal was detected; determining whether the absolute value for the change rate of the positional error has exceeded a predetermined reference value; and adding a backlash correction amount to the position command based on the positional error, when the absolute value for the change rate of the positional error exceeds the predetermined reference value.

In a third method for controlling a motor according to an eighth aspect of the present invention that corrects for backlash between a movable part that is driven by a motor and a driven part that is driven by the movable part, the method includes the steps executed by a computer of: detecting a first position which is a position of the movable part; detecting a second position which is a position of the driven part; calculating a positional error which is a deviation between a converted first position detected value arrived at by converting a first position detected value into a value of a position of the driven part according to a rotation ratio between the movable part and the driven part, and a second position detected value; creating a position command; detecting reversal of the position command; calculating an absolute value for a change rate of the positional error per unit variation of motor rotation angle since reversal was detected; determining whether the absolute value for the change rate of the positional error has exceeded a predetermined reference value; and adding a backlash correction amount to the position command based on the positional error, when the absolute value for the change rate of the positional error exceeds the predetermined reference value.

In a fourth method for controlling a motor according to a ninth aspect of the present invention that corrects for backlash between a movable part that is driven by a motor and a driven part that is driven by the movable part, the method includes the steps executed by a computer of: detecting a first position which is a position of the movable part; detecting a second position which is a position of the driven part; calculating a positional error which is a deviation between a converted first position detected value arrived at by converting a first position detected value into a value of a position of the driven part according to a rotation ratio between the movable part and the driven part, and a second position detected value; creating a position command; detecting reversal of the position command; calculating an absolute value for a change rate of the positional error per unit variation of an integrated value of the position command since reversal was detected; determining whether the absolute value for the change rate of the positional error has exceeded a predetermined reference value; and adding a backlash correction amount to the position command based on the positional error, when the absolute value for the change rate of the positional error exceeds the predetermined reference value.

In a first non-transitory computer readable medium according to a tenth aspect of the present invention which is recording a motor control program, the motor control program is for correcting backlash between a movable part that is driven by a motor and a driven part that is driven by the movable part, and enables a computer to execute the steps of: detecting a first position which is a position of the movable part; detecting a second position which is a position of the driven part; calculating a positional error which is a deviation between a converted first position detected value arrived at by converting a first position detected value into a value of a position of the driven part according to a rotation ratio between the movable part and the driven part, and a second position detected value; creating a position command; detecting reversal of the position command; calculating an absolute value for variation of the positional error since reversal was detected; determining whether the absolute value for the variation of the positional error has exceeded a predetermined reference value; and adding a backlash correction amount to the position command based on the positional error, when the absolute value for the variation of the positional error exceeds the predetermined reference value.

In a second non-transitory computer readable medium according to an eleventh aspect of the present invention which is recording a motor control program, the motor control program is for correcting backlash between a movable part that is driven by a motor and a driven part that is driven by the movable part, and enables a computer to execute the steps of: detecting a first position which is a position of the movable part; detecting a second position which is a position of the driven part; calculating a positional error which is a deviation between a converted first position detected value arrived at by converting a first position detected value into a value of a position of the driven part according to a rotation ratio between the movable part and the driven part, and a second position detected value; creating a position command; detecting reversal of the position command; calculating an absolute value for a change rate per unit time of the positional error since reversal was detected; determining whether the absolute value for the change rate of the positional error has exceeded a predetermined reference value; and adding a backlash correction amount to the position command based on the positional error, when the absolute value for the change rate of the positional error exceeds the predetermined reference value.

In a third non-transitory computer readable medium according to a twelfth aspect of the present invention which is recording a motor control program, the motor control program is for correcting backlash between a movable part that is driven by a motor and a driven part that is driven by the movable part, and enables a computer to execute the steps of: detecting a first position which is a position of the movable part; detecting a second position which is a position of the driven part; calculating a positional error which is a deviation between a converted first position detected value arrived at by converting a first position detected value into a value of a position of the driven part according to a rotation ratio between the movable part and the driven part, and a second position detected value; creating a position command; detecting reversal of the position command; calculating an absolute value for a change rate of the positional error per unit variation of motor rotation angle since reversal was detected; determining whether the absolute value for the change rate of the positional error has exceeded a predetermined reference value; and adding a backlash correction amount to the position command based on the positional error, when the absolute value for the change rate of the positional error exceeds the predetermined reference value.

In a fourth non-transitory computer readable medium according to a thirteenth aspect of the present invention which is recording a motor control program, the motor control program is for correcting backlash between a movable part that is driven by a motor and a driven part that is driven by the movable part, and enables a computer to execute the steps of: detecting a first position which is a position of the movable part; detecting a second position which is a position of the driven part; calculating a positional error which is a deviation between a converted first position detected value arrived at by converting a first position detected value into a value of a position of the driven part according to a rotation ratio between the movable part and the driven part, and a second position detected value; creating a position command; detecting reversal of the position command; calculating an absolute value for a change rate of the positional error per unit variation of an integrated value of the position command since reversal was detected; determining whether the absolute value for the change rate of the positional error has exceeded a predetermined reference value; and adding a backlash correction amount to the position command based on the positional error, when the absolute value for the change rate of the positional error exceeds the predetermined reference value.

According to the present invention, it is possible to add a backlash correction amount to the position command for a motor at an appropriate timing.

BRIEF DESCRIPTION OF THE DRAWINGS

FIG. 1A is an explanatory drawing for the behaviors of each shaft during reversal of a motor;

FIG. 1B is an explanatory drawing for the behaviors of each shaft during reversal of a motor;

FIG. 1C is an explanatory drawing for the behaviors of each shaft during reversal of a motor;

FIG. 1D is an explanatory drawing for the behaviors of each shaft during reversal of a motor;

FIG. 2 is a view showing the configuration of a motor control device according to a first embodiment of the present invention;

FIG. 3 is a flowchart showing processing of the motor control device according to the first embodiment of the present invention;

FIG. 4 is a view showing the timing of correction in the motor control device according to the first embodiment of the present invention;

FIG. 5A is a view showing time-dependent change of motor position and spindle position, and quadrant projection upon making circular interpolation motion in the case of not making correction;

FIG. 5B is a view showing time-dependent change of motor position and spindle position, and quadrant projection upon making circular interpolation motion in the case of making correction immediately after reversal;

FIG. 5C is a view showing time-dependent change of motor position and spindle position, and quadrant projection upon making circular interpolation motion in the case of making correction after reversal at the appropriate timing;

FIG. 6 is a view showing the configuration of a motor control device according to second to fourth embodiments of the present invention;

DETAILED DESCRIPTION OF THE INVENTION

Figure 7:
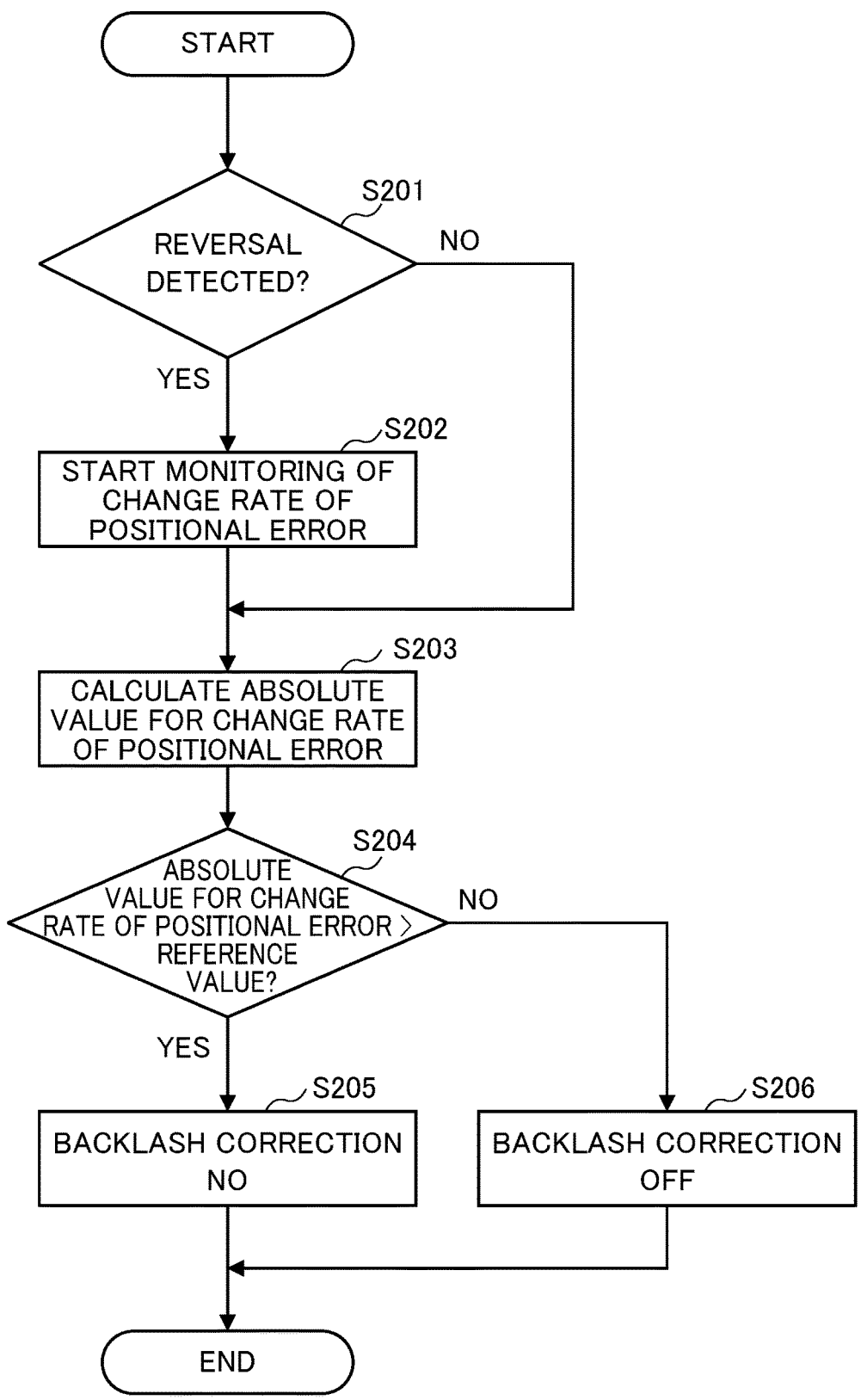
FIG. 7 is a flowchart showing the processing of the motor control device according to the second to fourth embodiments of the present invention.

Hereinafter, embodiments of the present invention will be explained using FIGS. 1 to 10.

Summary of Invention

FIG. 1 is an explanatory drawing for the summary of the present invention, and specifically illustrates the behavior of each shaft during reversal of a motor, when a reduction mechanism between the motor and a driven shaft (spindle) is configured from gears and a belt.

As shown in FIG. 1, a motor shaft gear 35 is fixed to the motor shaft 30 as a movable part. An intermediate shaft gear 45 is fixed to an intermediate shaft 40 which is provided separately from the motor shaft 30. In addition, by teeth 351 of the motor shaft gear 35 and teeth 451 of the intermediate shaft gear 45 meshing, in the case of the motor shaft 30 rotating in the clockwise direction, the intermediate shaft 40 will rotate in the counter-clockwise direction, while in the case of the motor shaft 30 rotating in the counter-clockwise direction, the intermediate shaft 40 will rotate in the clockwise direction. Furthermore, an endless belt 60 having elasticity is bridged between a portion of the intermediate shaft 40 at which the intermediate shaft gear 45 is not provided and the spindle 50 serving as a driven part.

Thereby, in a case of the intermediate shaft 40 rotating in the clockwise direction, the spindle 50 will rotate in the clockwise direction following this, while in the case of the intermediate shaft 40 rotating in the counter-clockwise direction, the spindle 50 will rotate in the counter-clockwise direction following this. The rotation of the motor shaft 30, intermediate shaft 40 and spindle 50 are thereby linked. More specifically, in the case of the motor shaft 30 rotating in the clockwise direction, the spindle 50 will rotate in the counter-clockwise direction, while in the case of the motor shaft 30 rotating in the counter-clockwise direction, the spindle 50 will rotate in the clockwise direction. In other words, the motor shaft 30 driven by the motor 20, and the spindle 50 driven by the motor shaft 30 are mechanically joined by the combination of the gears 35, 45 and the belt 60.

FIG. 1A shows an aspect of the positions of the motor shaft gear 35 and intermediate shaft gear 45 prior to reversal of the motor 20, and the tension acting on the belt 60. Herein, a case of the motor shaft 30 rotating in the clockwise direction is assumed. It should be noted that the embodiments of the present invention are not to be limited thereto.

As mentioned above, the motor shaft gear 35 and intermediate shaft gear 45 mesh, and the tooth 351 of the motor shaft gear 35 and the tooth 451 of the intermediate shaft gear 45 shown in FIG. 1A contact. Since the motor shaft 30 rotates in the clockwise direction, it forms a state in which the tooth 351 is pressing the tooth 451 downwards. Following this, the intermediate shaft gear 45, and consequently the intermediate shaft 40, rotate in the counter-clockwise direction. It should be noted that, upon making explanations shared with the plurality of tooth 351 of the motor shaft gear 35, it will be made to express "teeth 351" representatively.

Since the endless belt 60 is bridged between the intermediate shaft 40 and spindle 50, the spindle 50 will similarly rotate in the counter-clockwise direction, accompanying rotation in the counter-clockwise direction of the intermediate shaft 40. The belt 60 has two un-wound portions so as to follow two tangent lines extending from the outer circumferences of both shafts, between the intermediate shaft 40 and spindle 50. The un-wound portion on the upper side in FIG. 1A draws the spindle 50 in the counter-clockwise direction, whereby the spindle 50 rotates counter-clockwise. In other words, the upper side un-wound portion is a "tight side", and a lower side un-wound portion is a "loose side". Herein, in the case of defining the tension on the upper side un-wound portion as F1, and the tension on the lower side un-wound portion as F2, F1 will be greater than F2.

Next, FIG. 1B shows an aspect of the positions of the motor shaft gear 35 and intermediate shaft gear 45, and the tension acting on the belt 60, immediately after the motor 20 starts reversing in the counter-clockwise direction.

Accompanying the reversing of the motor shaft 30 to the counter-clockwise direction, since the motor shaft gear 35 will also rotate in the counter-clockwise direction, the tooth 351 of the motor shaft gear 35 will no longer press the tooth 451 of the intermediate shaft gear 45 downwards, and will start to move upwards. On the other hand, in the belt 60 bridged to the intermediate shaft 40, due to the tension F1 of the upper side un-wound portion becoming greater than the tension F2 of the lower side un-wound portion in FIG. 1, as mentioned above, the intermediate shaft 40 starts to rotate in the clockwise direction. Accompanying this, the spindle 50 also starts rotation in the clockwise direction. Upon doing so, the tooth 451 of the intermediate shaft gear 45 is not pressed against the tooth 351 of the motor shaft gear 35. In addition, accompanying rotation of the intermediate shaft gear 45 in the clockwise direction, the tooth 451 of the intermediate shaft gear 45 continues to contact with the tooth 351 of the motor shaft gear 35, due to moving upwards in FIG. 1. In other words, at this stage, a gap between the teeth 351 of the motor shaft gear 35 and the teeth 451 of the intermediate shaft gear 45, i.e. backlash, still has not occurred.

As mentioned above, the intermediate shaft 40 and spindle 50 will rotate in the clockwise direction, due to the tension F1 on the upper side un-wound portion of the belt 60 being greater than the tension F2 on the lower side un-wound portion. Then, accompanying continuing rotation to the clockwise direction, the difference between the two tensions F1 and F2 becomes smaller.

Soon thereafter, as shown in FIG. 1C, rotation of the intermediate shaft 40, and consequently the spindle 50, stops at the stage at which the tension F1 and tension F2 become substantially equal. On the other hand, since the motor shaft 30 continues reversal to the counter-clockwise direction, a gap between the tooth 351 of the motor shaft gear 35 and the tooth 451 of the intermediate shaft gear 45, i.e. backlash, occurs.

Subsequently, as shown in FIG. 1D, a tooth 352 that is at the lower side of the above-mentioned tooth 351 among the teeth of the motor shaft gear 35 moves by the above-mentioned backlash amount, and then contacts the tooth 451 of the intermediate shaft from the lower side. The intermediate shaft 40, and consequently the spindle 50, thereby start rotation in the clockwise direction again. It should be noted that, in FIG. 1D, the rotation direction of each shaft is opposite to FIG. 1A.

More specifically, among the two un-wound portions of the belt 60 existing between the intermediate shaft 40 and spindle 50, the spindle 50 rotates clockwise by way of the lower side un-wound portion in FIG. 1 drawing the spindle 50 in the clockwise direction. In other words, the lower side un-wound portion of the belt 60 is the "tight side", and the upper side un-wound portion is the "loose side". Herein, in the case of defining the tension on the upper side un-wound portion of the belt 60 as F1, and the tension on the lower side un-wound portion of the belt 60 as F2, F1 will be less than F2.

Based on the above, in the case of the reduction mechanism between the motor 20 and spindle 50 being configured from the gears 35, 45 and the belt 60, when put in other words, in the case of the motor shaft 30 driven by the motor 20, and the spindle 50 driven by the motor shaft 30 being mechanically joined by the combination of the gears 35, 45 and the belt 60, although the spindle 50 will immediately start reversal immediately after reversing of the motor 20, the rotation of the spindle 50 temporarily stops a short time thereafter, and will make movement again such that the reversing operation of the spindle 50 is started subsequently.

Herein, if assuming to perform backlash correction so that the tooth 351 of the motor shaft gear 35 can quickly move by the above-mentioned backlash amount immediately after reversal of the motor 20, in addition to the tension on the tight side of the belt 60, the force of backlash correction acts, and the intermediate shaft 40 will suddenly reverse. Accompanying this, the spindle 50 would also suddenly reverse, and the position of the spindle 50 would advance more ahead than from the position commanded according to the position command.

To prevent this, not performing correction immediately after reversal, but rather performing backlash correction by having reversal performed spontaneously at the intermediate shaft gear 45 for a moment, and the tension on the tight side of the belt 60 relaxing, is the concept serving as the basis of the present invention.

First Embodiment

FIG. 2 is a view showing the configuration of a motor control device 10 according to a first embodiment.

The motor control device 10 mainly includes; a first position detection part 101 such as an encoder that detects the position of the motor shaft 30 (referred to as "first position" or "motor position") serving as the movable part driven by the motor 20; a second position detection part 103 that detects the position of the spindle 50 (referred to as "second position" or "spindle position"), which is the driven part being driven by the above-mentioned movable part (motor shaft 30); and a positional error calculation part 104 that calculates the deviation between the aforementioned first position and second position (referred to as "positional error"). It should be noted that the above-mentioned "first position" or "motor position" is a position acquired using a semi-closed loop, and the "second position" or "spindle position" is a position acquired using a full-closed loop.

Furthermore, the motor control device 10 includes a position command creation part 105, reversal detection part 106, positional error variation calculation part 107, determination part 108, backlash correction part 109 and adder 110. The position command creation part 105 creates a position command for the above-mentioned motor 20. The reversal detection part 106 detects reversal of the above-mentioned position command. The positional error variation calculation part 107 calculates the variation in the above-mentioned positional error after reversal is detected. The determination part 108 determines whether the variation in the above-mentioned positional error has exceeded a predetermined reference value. The backlash correction part 109 calculates the backlash correction amount in the case of the variation in the above-mentioned positional error exceeding the predetermined reference value, and adds this backlash correction amount to the above-mentioned position command using the adder 110.

The position command to which the above-mentioned backlash correction amount was added is sent to the motor 20 from a control unit 111.

It should be noted that the above-mentioned positional error calculation part 104 calculates the deviation between the above-mentioned first position and second position as the positional error. More specifically, by multiplying a conversion factor 102 by the above-mentioned first position detected value, a converted first position detected value arrived at by converting to the value of the position of the driven part (spindle position) is calculated, and the deviation between this converted first position detected value and the second position detected value is calculated as the positional error. As this conversion factor 102, for example, it is possible to use the rotation ratio between the movable part (motor shaft 30) and the driven part (spindle 50).

In addition, the above-mentioned backlash correction amount can be calculated according to a known method, using either or both of the above-mentioned first position and second position, for example, a relative position relationship between the first position and second position, or the above-mentioned positional error. As one example, it may be calculated using the method described in Patent Document 1.

Next, although partially repeated, the operation flow of the above-mentioned motor control device 10 will be explained using FIG. 3.

First, the reversal detection part 106 monitors reversal of the position command created by the position command creation part 105 (Step S101). In the case of reversal being detected (S101: YES), the positional error variation calculation part 107 initializes the variation of positional error to 0 (Step S102). Then, the positional error variation calculation part 107 calculates the absolute value for variation of the positional error (Step S103). On the other hand, in the case of reversal of the position command not being detected (S101: NO), rather than passing through the step of initialization of S102 again, the positional error variation calculation part 107 calculates the absolute value for the variation of the positional error.

Next, the determination part 108 compares the absolute value for the variation in the above-mentioned positional error with a predetermined reference value (Step S104). In the case of this absolute value having exceeded the reference value (S104: YES), the backlash correction part 109 adds the backlash correction amount to the position command. In other words, the motor control device 10 sets the backlash correction to ON (Step S105). In the case of the above-mentioned absolute value not exceeding the reference value (S104: NO), the backlash correction part 109 does not add the backlash correction amount to the position command. In other words, the motor control device 10 sets the backlash correction to OFF (Step S106).

FIG. 4 is a view showing the continuous change in the absolute value for the variation in the positional error and the timing of correction, upon comparing the absolute value for the variation in positional error with the predetermined reference value. In the case of detecting reversal in Step S101, since the absolute value for the positional error is initialized to 0 in the above-mentioned way, the graph of the absolute value for the positional error draws a vertically downwards trajectory relative to the time axis, and reaches point A, as shown in FIG. 4. Subsequently, although the absolute value for the positional error is not increasing, the backlash correction amount is added to the position command at the stage exceeding the reference value, i.e. in Step S105 corresponding to point B in FIG. 4. It should be noted that, in the graph of FIG. 4, the absolute value for the positional error keeps a constant value at the stage prior to point A, and a short while after passing through point B, keeps the same constant value again. This is because the teeth of the motor shaft gear and the teeth of the intermediate shaft gear mesh.

FIGS. 5A to 5C are views showing the successive changes in motor position and spindle position, and quadrant projection upon making circular interpolation motion using this motor, in the case of not making backlash correction, in the case of making backlash correction immediately after reversal of the motor, and in the case of making backlash correction at the appropriate timing using the motor control device according to the present embodiment.

FIG. 5A is a view for the case of not making correction, FIG. 5B is a view for the case of making backlash correction immediately after reversal of the motor, and FIG. 5C is a view for a case of making backlash correction at the appropriate timing using the motor control device according to the present embodiment.

In addition, the graph at the left side in each of FIGS. 5A, 5B and 5C is a graph showing the successive changes in motor position and spindle position, in which the dotted line represents the spindle position, and the one-dot dashed line represents the motor position. In addition, the drawing at the right side in each of FIGS. 5A, 5B and 5C is a drawing showing the quadrant projection upon making eccentric circular interpolation motion shown in FIG. 11, using the present control axis having a reduction mechanism made using gears and a belt as the rotation axis, according to interpolation between this and another linear axis.

Figure 11:
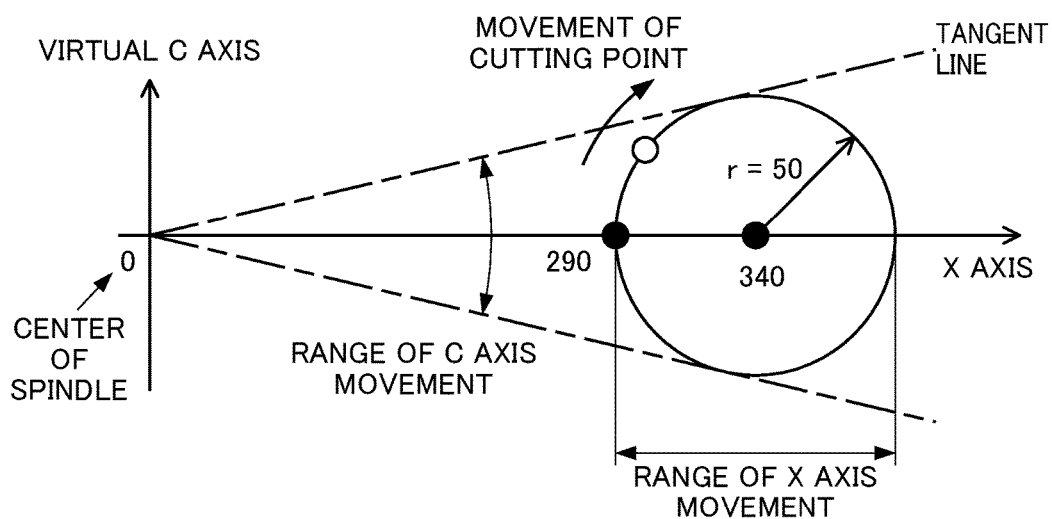
FIG. 11 is a view showing an eccentric arc program (arc conditions) during arc measurement in FIG. 5.

FIG. 11 is a view showing an eccentric arc program (arc conditions) during arc measurement in FIGS. 5A to 5C. The center of the coordinates corresponds to the center of the table of a spindle. It is cut so as to depict a circle of 50 mm diameter with the point separated by 340 mm from the center of the table as the center. By rotation of the spindle (C axis), the cutting point moves in the virtual C axis direction. According to the feed shaft (X axis) such as a servo shaft, the cutting point moves in the X axis direction. By moving the spindle and feed shaft according to the eccentric arc program, it becomes possible to move the cutting point in an arc shape such as that described above.

The graph at the left side in FIG. 5A is a graph showing the successive changes in the motor position and spindle position in the case of not making backlash correction. As shown in the circle of the dotted line, the position of the spindle is delayed compared to the motor position a short time after reversal. In addition, as shown in the circles of the dotted line also in the drawing on the right side of FIG. 5A, the quadrant projection according to the reversal delay of the spindle is drawn to correspond to this.

The graph at the left side in FIG. 5B shows the successive changes in the motor position and spindle position, for the case of making backlash correction immediately after reversal of the motor. By performing correction prior to the teeth of the motor shaft gear starting to move within backlash, a large wedge occurs during reversal, as shown in the circle of the dotted line. This wedge occurs due to greatly moving in the reverse direction because the tension in the reverse direction acts from the belt on the tight side, in addition to force in the reverse direction from correction. In addition, as shown in the ellipse of the dotted line also in the drawing on the right side of FIG. 5B, an arc wedge occurs corresponding to this. Furthermore, the quadrant projection from the reversal delay of the spindle also remains.

The graph at the left side in FIG. 5C is a graph showing the successive changes in the motor position and spindle position for the case of making backlash correction at the appropriate timing using the motor control device according to the present embodiment. As is evident when comparing with the graph at the left side in FIG. 5A, for the time from the spindle position starting to lag behind the motor position until the angular velocity of both reaching the same value (time until slopes of both graphs become the same), FIG. 5C is shorter than FIG. 5A (d1>d2). Furthermore, a wedge such as that seen in the left graph in the middle stage does not occur. In addition, a wedge in an arc does not occur as shown in the drawing at the right side in FIG. 5C, as well as the quadrant projection being suppressed as shown in the circle of the dotted line, corresponding to this.

As is evident when comparing these drawings, it becomes possible to add the backlash correction amount to the position command for the motor at the appropriate timing by way of the motor control device according to the first embodiment.

Second Embodiment

FIG. 6 is a view showing the configuration of a motor control device 10A according to the second embodiment. It should be noted that the same reference symbols are used for constituent elements that are the same as the motor control device 10 according to the first embodiment, and specific explanations thereof will be omitted.

The motor control device 10A according to the second embodiment differs in the point of including a positional error change-rate calculation part 207 in place of the positional error variation calculation part 107 of the motor control device 10 according to the first embodiment. The motor control device 10 according to the first embodiment sets the backlash correction to ON in the case of the variation of the positional error having exceeded the predetermined reference value; however, the motor control device 10A according to the second embodiment sets the backlash correction to ON in the case of the change rate of the positional error having exceeded a predetermined reference value.

Next, although partially repeating, the operation flow of the above-mentioned motor control device 10A will be explained using FIG. 7.

First, the reverse detection part 106 monitors reversal of the position command created by the position command creation part 105 (Step S201). In the case of reversal being detected (S201: YES), the positional error change-rate calculation part 207 starts monitoring of the change rate per unit time of the positional error (Step S202). Then, the positional error change-rate calculation part 207 calculates the absolute value for the change rate per unit time of the positional error (Step S203). On the other hand, in the case of reversal of the position command not being detected (S201: NO), the positional error change-rate calculation part 207 calculates the absolute value for the change rate per unit time of the positional error, without passing through the step of monitoring start in Step S202 again.

Next, the determination part 108 compares the absolute value for the change rate in the above-mentioned positional error with a predetermined reference value (Step S204). In the case of this absolute value having exceeded the reference value (S204: YES), the backlash correction part 109 adds the backlash correction amount to the position command. In other words, the motor control device 10A sets the backlash correction to ON (Step S205). In the case of the above-mentioned absolute value not exceeding the reference value (S204: NO), the backlash correction part 109 does not add the backlash correction amount to the position command. In other words, the motor control device 10A sets the backlash correction to OFF (Step S206).

Figure 8:
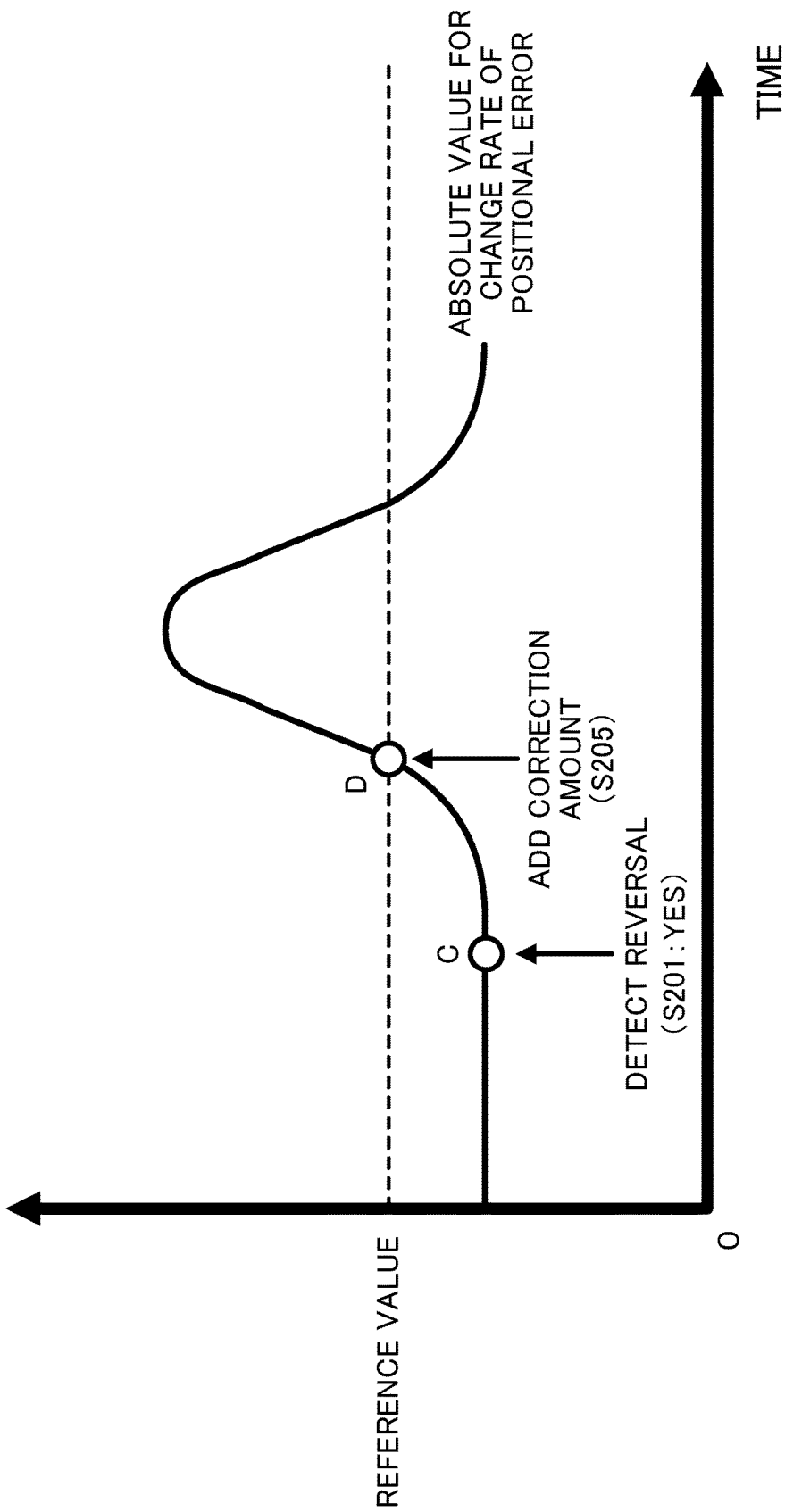
FIG. 8 is a view showing the timing of correction in the motor control device according to the second embodiment of the present invention.

FIG. 8 is a graph showing the successive change in the absolute value for the change rate per unit time of the positional error, and the timing of correction, upon the determination unit 108 comparing the absolute value for the change rate per unit time of the positional error with the predetermined reference value. Although the absolute value for the change rate increases after detecting reversal at point C corresponding to Step S201, at the stage exceeding the reference value, i.e. Step S205 corresponding to point D in FIG. 8, the backlash correction part 109 adds the backlash correction amount to the position command.

Also in the motor control device according to the second embodiment, it is possible to add the backlash correction amount to the position command for the motor 20 at the appropriate timing, similarly to the motor control device according to the first embodiment.

Third Embodiment

Figure 9:
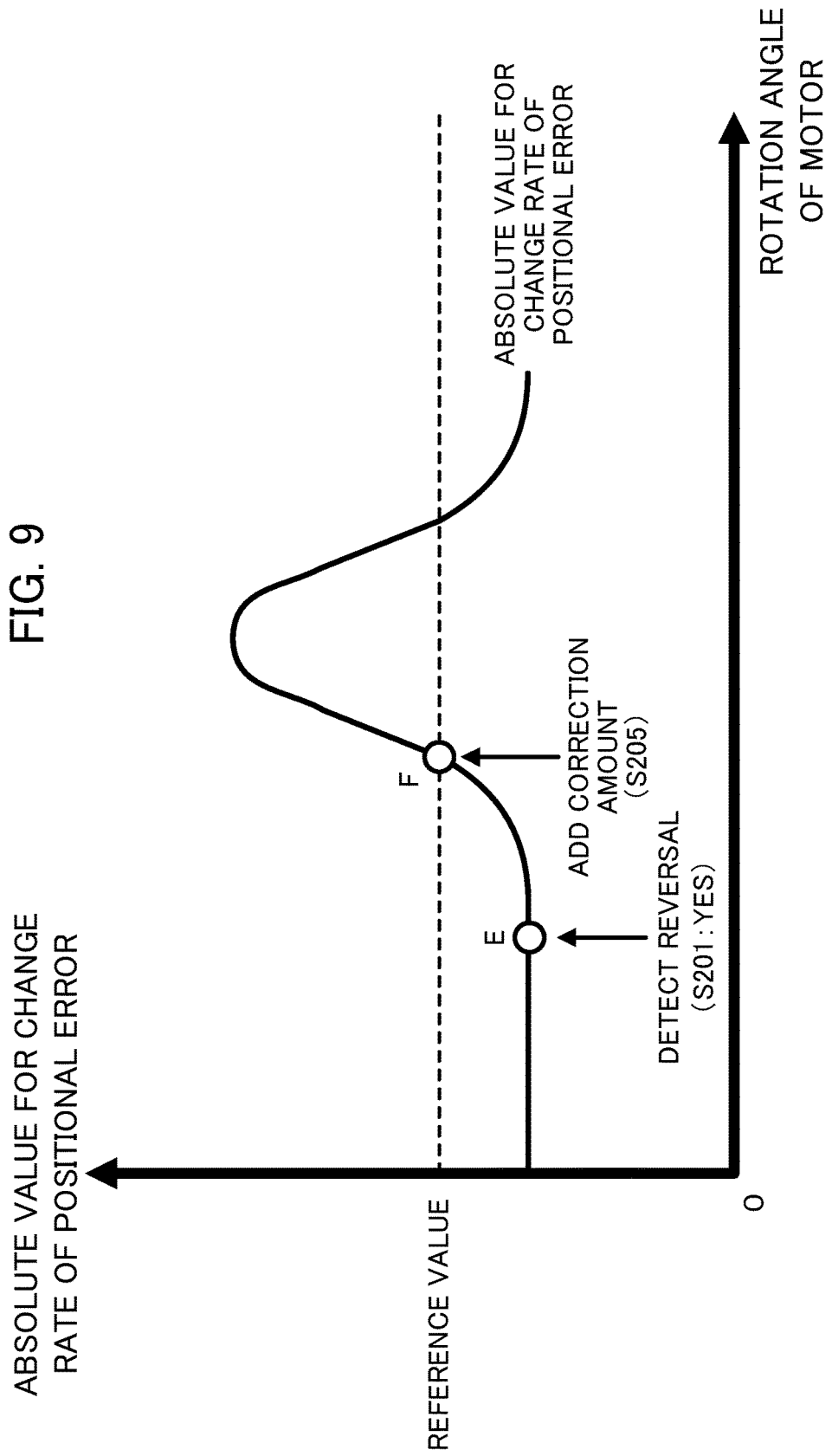
FIG. 9 is a view showing the timing of correction in the motor control device according to the third embodiment of the present invention.

FIG. 9 is a graph showing the change in the absolute value for the change rate of the positional error and the timing of correction upon a motor control device according to a third embodiment comparing the absolute value for the change rate of this positional error with a reference value. It should be noted that the same reference symbols are used for constituent elements that are the same as the motor control device 10A according to the second embodiment, and specific explanations thereof will be omitted. In addition, since the operation flow of the motor control device according to the third embodiment is basically identical to the motor control device 10A according to the second embodiment, explanation thereof will be omitted.

In the second embodiment, although the absolute value for the change rate of the positional error per unit time is compared with the predetermined reference value, in the third embodiment, the absolute value for the change rate in the positional error per unit variation of motor revolution angle is compared with a predetermined reference value.

Similarly to FIG. 8, the absolute value for the change rate increases after detecting reversal at point E corresponding to Step S201 in FIG. 9; however, at the stage exceeding the reference value, i.e. in Step S205 corresponding to point F in FIG. 9, the backlash correction part 109 adds the backlash correction amount to the position command.

Also in the motor control device according to the third embodiment, it becomes possible to add the backlash correction amount to the position command for the motor 20 at the appropriate timing, similarly to the motor control devices according to the first and second embodiments.

Fourth Embodiment

Figure 10:
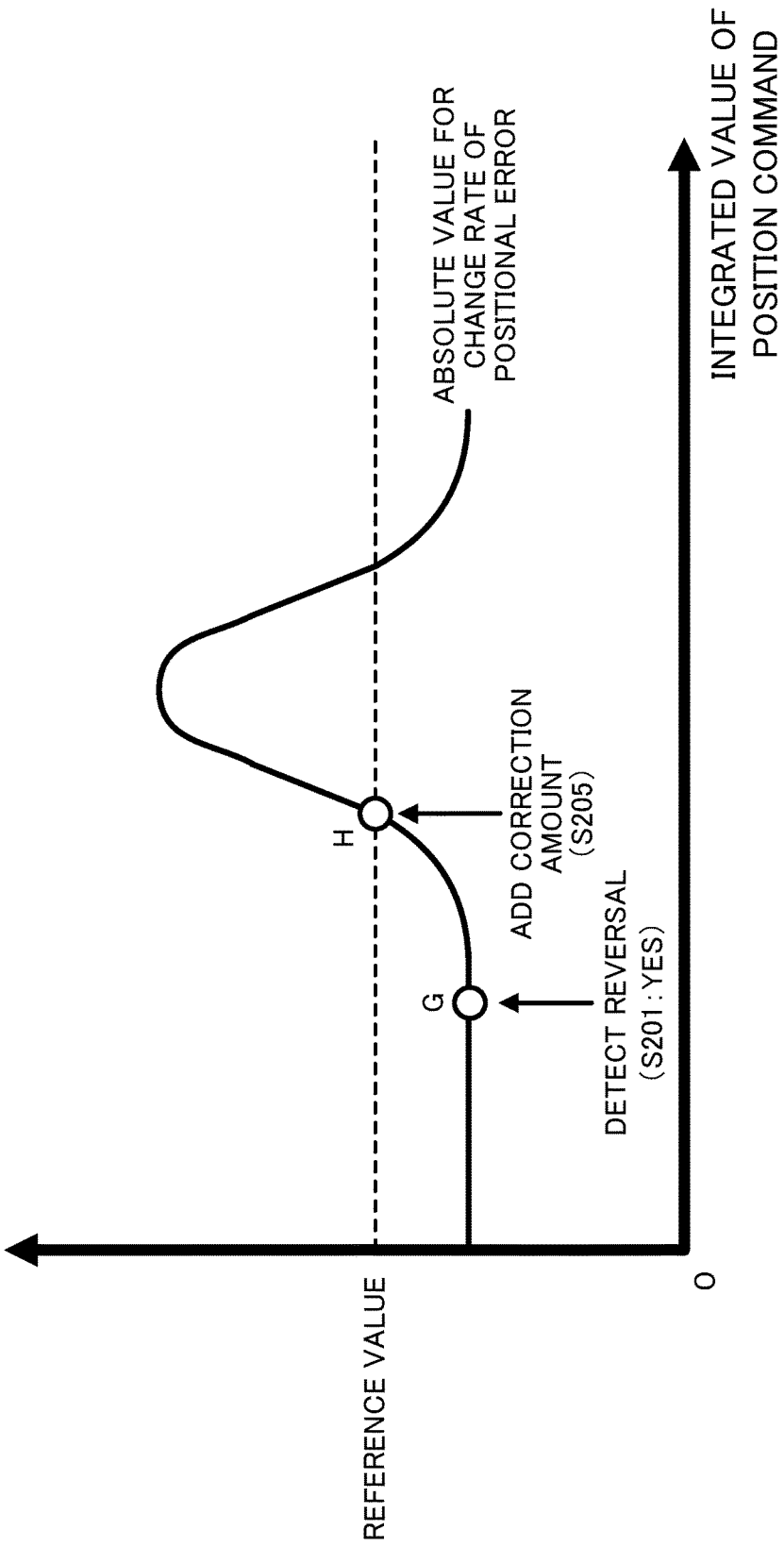
FIG. 10 is a view showing the timing of correction in the motor control device according to the fourth embodiment of the present invention.

FIG. 10 is a graph showing the change in absolute value for the change rate of the positional error and the timing of correction, upon the motor control device according to the fourth embodiment comparing the absolute value for the change rate in this positional error with a reference value. It should be noted that, since the motor control device according to the fourth embodiment is the same configuration as the motor control device 10A according to the second embodiment and the motor control device according to the third embodiment, explanations thereof will be omitted. In addition, since the operation flow of the motor control device according to the fourth embodiment is also basically identical to the motor control device 10A according to the second embodiment and the motor control device according to the third embodiment, explanation thereof will be omitted.

In the second embodiment, the absolute value for the change rate of the positional error per unit time is compared with the predetermined reference value. In addition, in the third embodiment, the absolute value for the change rate of the positional error per unit variation of motor revolution angle is compared with the predetermined reference value. On the other hand, in the fourth embodiment, the absolute value for the change rate of the positional error per unit variation in the integrated value of the position command is compared with a predetermined reference value.

Similarly to FIGS. 8 and 9, the absolute value for the change rate increases after detecting reversal at point G corresponding to Step S201 also in FIG. 10; however, at the stage of exceeding the reference value, i.e. in Step S205 corresponding to point H in FIG. 10, the backlash correction part 109 adds the backlash correction amount to the position command.

Also in the motor control device according to the fourth embodiment, it becomes possible to add the backlash correction amount to the position command for the motor 20 at the appropriate timing, similarly to the motor control devices 10, 10A according to the first to third embodiments.

Although embodiments of the present invention have been explained above, the present invention is not to be limited to the aforementioned embodiments. In addition, the effects described in the present embodiments are merely listing the most preferred effects produced from the present invention, and the effects according to the present invention are not to be limited to those described in the present embodiments.

The control method by the motor control devices 10, 10A is realized by way of software. In the case of being realized by software, the programs constituting this software are installed to a computer (motor control device 10, 10A). In addition, these programs may be distributed to users by being recorded on removable media, or may be distributed by downloaded to the computer of the user via a network. Furthermore, these programs may be provided to the computer (motor control device 10, 10A) of the user as a Web service via a network without being downloaded.

EXPLANATION OF REFERENCE NUMERALS 10, 10A motor control device
20 motor
30 motor shaft (movable part)
35 motor shaft gear
40 intermediate shaft
45 intermediate shaft gear
50 spindle (driven part)
60 belt
101 first position detection part
102 conversion factor
103 second position detection part
104 positional error calculation part
105 position command creation part
106 reversal detection part
107 positional error variation calculation part
108 determination part
109 backlash correction part
110 adder
101 control unit
207 positional error change-rate calculation part
351 tooth
352 tooth
451 tooth

What is claimed is:

1. A motor control device for correcting backlash between a movable part that is driven by a motor, and a driven part that is driven by the movable part, the device comprising:
   a first position detection part that detects a first position which is a position of the movable part;
   a second position detection part that detects a second position which is a position of the driven part;
   a positional error calculation part that calculates positional error, which is deviation between a converted first position detected value arrived at by converting a first position detected value detected by the first position detection part into a value of a position of the driven part according to a rotation ratio between the movable part and the driven part; and a second position detected value detected by the second position detection part;
   a position command creation part that creates a position command;
   a reversal detection part that detects reversal of the position command;
   a positional error variation calculation part that calculates an absolute value for variation of the positional error since reversal was detected;
   a determination part that determines whether the absolute value for the variation of the positional error has exceeded a predetermined reference value; and
   a backlash correction part that adds a backlash correction amount to the position command based on the positional error,
   wherein the backlash correction part adds the backlash correction amount when the absolute value for the variation of the positional error exceeds the predetermined reference value.

2. The motor control device according to claim 1, wherein the movable part driven by the motor and the driven part driven by the movable part are mechanically joined by combination of gears and a belt.

3. A motor control device for correcting backlash between a movable part that is driven by a motor, and a driven part that is driven by the movable part, the device comprising:
   a first position detection part that detects a first position which is a position of the movable part;
   a second position detection part that detects a second position which is a position of the driven part;
   a positional error calculation part that calculates positional error, which is deviation between a converted first position detected value arrived at by converting a first position detected value detected by the first position detection part into a value of a position of the driven part according to a rotation ratio between the movable part and the driven part; and a second position detected value detected by the second position detection part;

a position command creation part that creates a position command;
a reversal detection part that detects reversal of the position command;
a positional error change-rate calculation part that calculates an absolute value for a change rate per unit time of the positional error since reversal was detected;
a determination part that determines whether the absolute value for the change rate of the positional error has exceeded a predetermined reference value; and
a backlash correction part that adds a backlash correction amount to the position command based on the positional error,
wherein the backlash correction part adds the backlash correction amount when the absolute value for the change rate of the positional error exceeds the predetermined reference value.

4. A motor control device for correcting backlash between a movable part that is driven by a motor, and a driven part that is driven by the movable part, the device comprising:
a first position detection part that detects a first position which is a position of the movable part;
a second position detection part that detects a second position which is a position of the driven part;
a positional error calculation part that calculates positional error, which is deviation between a converted first position detected value arrived at by converting a first position detected value detected by the first position detection part into a value of a position of the driven part according to a rotation ratio between the movable part and the driven part; and a second position detected value detected by the second position detection part;
a position command creation part that creates a position command;
a reversal detection part that detects reversal of the position command;
a positional error change-rate calculation part that calculates an absolute value for a change rate of the positional error per unit variation of motor revolution angle since reversal was detected;
a determination part that determines whether the absolute value for the change rate of the positional error has exceeded a predetermined reference value; and
a backlash correction part that adds a backlash correction amount to the position command based on the positional error,
wherein the backlash correction part adds the backlash correction amount when the change rate of the positional error exceeds the predetermined reference value.

5. A motor control device for correcting backlash between a movable part that is driven by a motor, and a driven part that is driven by the movable part, the device comprising:
a first position detection part that detects a first position which is a position of the movable part;
a second position detection part that detects a second position which is a position of the driven part;
a positional error calculation part that calculates positional error, which is deviation between a converted first position detected value arrived at by converting a first position detected value detected by the first position detection part into a value of a position of the driven part according to a rotation ratio between the movable part and the driven part; and a second position detected value detected by the second position detection part;

a position command creation part that creates a position command;
a reversal detection part that detects reversal of the position command;
a positional error change-rate calculation part that calculates an absolute value for a change rate of the positional error per unit variation of an integrated value of the position command since reversal was detected;
a determination part that determines whether the absolute value for the change rate of the positional error has exceeded a predetermined reference value; and
a backlash correction part that adds a backlash correction amount to the position command based on the positional error,
wherein the backlash correction part adds the backlash correction amount when the absolute value for the change rate of the positional error exceeds the predetermined reference value.

6. A method for controlling a motor that corrects for backlash between a movable part that is driven by a motor and a driven part that is driven by the movable part, the method comprising the steps executed by a computer of:
detecting a first position which is a position of the movable part;
detecting a second position which is a position of the driven part;
calculating a positional error which is a deviation between a converted first position detected value arrived at by converting a first position detected value into a value of a position of the driven part according to a rotation ratio between the movable part and the driven part, and a second position detected value;
creating a position command;
detecting reversal of the position command;
calculating an absolute value for variation of the positional error since reversal was detected;
determining whether the absolute value for the variation of the positional error has exceeded a predetermined reference value; and
adding a backlash correction amount to the position command based on the positional error, when the absolute value for the variation of the positional error exceeds the predetermined reference value.

7. A method for controlling a motor that corrects for backlash between a movable part that is driven by a motor and a driven part that is driven by the movable part, the method comprising the steps executed by a computer of:
detecting a first position which is a position of the movable part;
detecting a second position which is a position of the driven part;
calculating a positional error which is a deviation between a converted first position detected value arrived at by converting a first position detected value into a value of a position of the driven part according to a rotation ratio between the movable part and the driven part, and a second position detected value;
creating a position command;
detecting reversal of the position command;
calculating an absolute value for a change rate per unit time of the positional error since reversal was detected;
determining whether the absolute value for the change rate of the positional error has exceeded a predetermined reference value; and
adding a backlash correction amount to the position command based on the positional error, when the absolute value for the change rate of the positional error exceeds the predetermined reference value.

8. A method for controlling a motor that corrects for backlash between a movable part that is driven by a motor and a driven part that is driven by the movable part, the method comprising the steps executed by a computer of:
   detecting a first position which is a position of the movable part;
   detecting a second position which is a position of the driven part;
   calculating a positional error which is a deviation between a converted first position detected value arrived at by converting a first position detected value into a value of a position of the driven part according to a rotation ratio between the movable part and the driven part, and a second position detected value;
   creating a position command;
   detecting reversal of the position command;
   calculating an absolute value for a change rate of the positional error per unit variation of motor rotation angle since reversal was detected;
   determining whether the absolute value for the change rate of the positional error has exceeded a predetermined reference value; and
   adding a backlash correction amount to the position command based on the positional error, when the absolute value for the change rate of the positional error exceeds the predetermined reference value.

9. A method for controlling a motor that corrects for backlash between a movable part that is driven by a motor and a driven part that is driven by the movable part, the method comprising the steps executed by a computer of:
   detecting a first position which is a position of the movable part;
   detecting a second position which is a position of the driven part;
   calculating a positional error which is a deviation between a converted first position detected value arrived at by converting a first position detected value into a value of a position of the driven part according to a rotation ratio between the movable part and the driven part, and a second position detected value;
   creating a position command;
   detecting reversal of the position command;
   calculating an absolute value for a change rate of the positional error per unit variation of an integrated value of the position command since reversal was detected;
   determining whether the absolute value for the change rate of the positional error has exceeded a predetermined reference value; and
   adding a backlash correction amount to the position command based on the positional error, when the absolute value for the change rate of the positional error exceeds the predetermined reference value.

10. A non-transitory computer readable medium recording a motor control program for correcting backlash between a movable part that is driven by a motor and a driven part that is driven by the movable part, the program enabling a computer to execute the steps of:
    detecting a first position which is a position of the movable part;
    detecting a second position which is a position of the driven part;
    calculating a positional error which is a deviation between a converted first position detected value arrived at by converting a first position detected value into a value of a position of the driven part according to a rotation ratio between the movable part and the driven part, and a second position detected value;
    creating a position command;
    detecting reversal of the position command;
    calculating an absolute value for variation of the positional error since reversal was detected;
    determining whether the absolute value for the variation of the positional error has exceeded a predetermined reference value; and
    adding a backlash correction amount to the position command based on the positional error, when the absolute value for the variation of the positional error exceeds the predetermined reference value.

11. A non-transitory computer readable medium recording a motor control program for correcting backlash between a movable part that is driven by a motor and a driven part that is driven by the movable part, the program enabling a computer to execute the steps of:
    detecting a first position which is a position of the movable part;
    detecting a second position which is a position of the driven part;
    calculating a positional error which is a deviation between a converted first position detected value arrived at by converting a first position detected value into a value of a position of the driven part according to a rotation ratio between the movable part and the driven part, and a second position detected value;
    creating a position command;
    detecting reversal of the position command;
    calculating an absolute value for a change rate per unit time of the positional error since reversal was detected;
    determining whether the absolute value for the change rate of the positional error has exceeded a predetermined reference value; and
    adding a backlash correction amount to the position command based on the positional error, when the absolute value for the change rate of the positional error exceeds the predetermined reference value.

12. A non-transitory computer readable medium recording a motor control program for correcting backlash between a movable part that is driven by a motor and a driven part that is driven by the movable part, the program enabling a computer to execute the steps of:
    detecting a first position which is a position of the movable part;
    detecting a second position which is a position of the driven part;
    calculating a positional error which is a deviation between a converted first position detected value arrived at by converting a first position detected value into a value of a position of the driven part according to a rotation ratio between the movable part and the driven part, and a second position detected value;
    creating a position command;
    detecting reversal of the position command;
    calculating an absolute value for a change rate of the positional error per unit variation of motor rotation angle since reversal was detected;
    determining whether the absolute value for the change rate of the positional error has exceeded a predetermined reference value; and
    adding a backlash correction amount to the position command based on the positional error, when the absolute value for the change rate of the positional error exceeds the predetermined reference value.

13. A non-transitory computer readable medium recording a motor control program for correcting backlash between a movable part that is driven by a motor and a driven part that is driven by the movable part, the program enabling a computer to execute the steps of:
- detecting a first position which is a position of the movable part;
- detecting a second position which is a position of the driven part;
- calculating a positional error which is a deviation between a converted first position detected value arrived at by converting a first position detected value into a value of a position of the driven part according to a rotation ratio between the movable part and the driven part, and a second position detected value;
- creating a position command;
- detecting reversal of the position command;
- calculating an absolute value for a change rate of the positional error per unit variation of an integrated value of the position command since reversal was detected;
- determining whether the absolute value for the change rate of the positional error has exceeded a predetermined reference value; and
- adding a backlash correction amount to the position command based on the positional error, when the absolute value for the change rate of the positional error exceeds the predetermined reference value.

* * * * *